Figure 1:
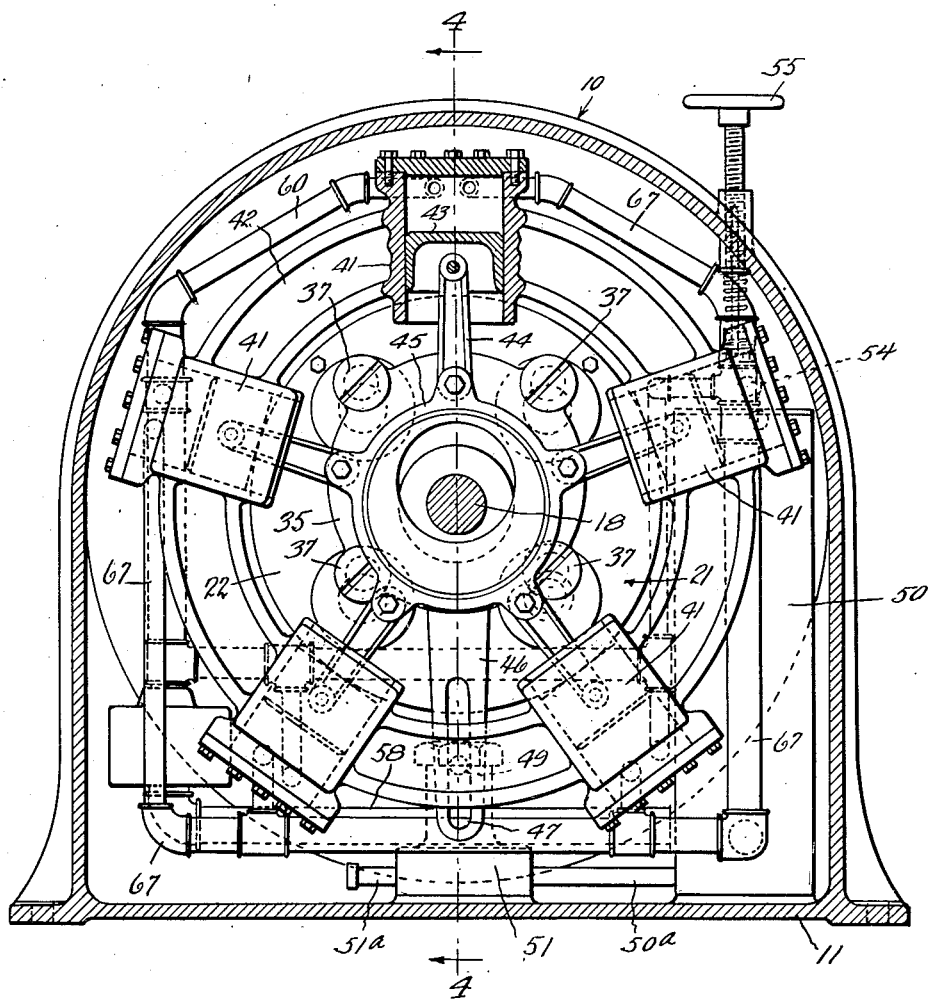

June 10, 1930.  C. C. HOWER  1,762,553
POWER TRANSMISSION MECHANISM
Filed April 4, 1929   6 Sheets-Sheet 1

Inventor
Charles C. Hower
By Hull, Brock & West
Attorney

June 10, 1930. C. C. HOWER 1,762,553
POWER TRANSMISSION MECHANISM
Filed April 4, 1929 6 Sheets-Sheet 3

Inventor
Charles C. Hower
By Hull, Brock & West
Attorney

June 10, 1930.  C. C. HOWER  1,762,553
POWER TRANSMISSION MECHANISM
Filed April 4, 1929   6 Sheets-Sheet 4

Inventor
Charles C. Hower
By Hull, Brock & West
Attorney

June 10, 1930.  C. C. HOWER  1,762,553
POWER TRANSMISSION MECHANISM
Filed April 4, 1929  6 Sheets-Sheet 5

Inventor
Charles C. Hower
By Hull, Brock & West
Attorney

June 10, 1930.  C. C. HOWER  1,762,553
POWER TRANSMISSION MECHANISM
Filed April 4, 1929  6 Sheets-Sheet 6

Inventor
Charles C. Hower
By Hull, Brock & West
Attorney

Patented June 10, 1930

1,762,553

UNITED STATES PATENT OFFICE

CHARLES C. HOWER, OF CLEVELAND, OHIO

POWER-TRANSMISSION MECHANISM

Application filed April 4, 1929. Serial No. 352,382.

My invention relates to power transmission mechanisms and particularly to transmission mechanism in which the planetary arrangement of gears is used through which power may be transmitted from a driving shaft to a driven shaft and to relative speed of the driven shaft increased or decreased without the disengaging of gears.

The object of my invention is to provide a power transmission mechanism which permits a gradual application of the load on the driving device as is desirable in many places such as in synchronous motors, Diesel engines, etc.

A further object is to provide a power transmission mechanism in which the power transmitted may be limited to any desired amount up to the maximum for the particular source, as required in broaching machines when delicate broaches are used or where it is desired that the driven mechanism should stop when a predetermined load is reached as in baling machines, presses, etc.

A still further object is to provide a power transmitting device which may be set so that there is an automatic decrease in speed of the driven member for an increase in the load and an increase in speed again up to normal as the load is reduced thereby maintaining an equalized condition and thus prevent overloading the prime mover.

A further object of my invention is to provide a power transmitting mechanism in which the operation of the planetary gears is controlled by fluid pressure in such a manner that a constant variation of speed of the driven member may be obtained up to the speed of the driving element.

A further object is to provide a transmission mechanism in which the relative motion of the planetary gears is controlled by pistons operating against fluid pressure and connected in such a way that when the driven member is operating at the same speed as the driving member there is no relative rotation of the gears nor movement of the pistons, so that a smooth and noiseless transmission of power is obtained under normal operation, and in which the fluid pressure against which pistons operate is created by a small pump operated independently of the pressure controlled pistons, so a constant pressure of any predetermined amount may be maintained.

A still further object is to provide a circulatory system for the fluid in which the transmission casing itself is the storage reservoir and when oil is used the same oil serves to lubricate all moving parts.

A further object is to provide a transmission which is compact in construction and which is efficient and reliable in operation.

With these and other objects in view as will appear from the description the invention resides in all the novel features of construction and combination of parts herein disclosed and particularly pointed out in the appended claims.

Figure 2:
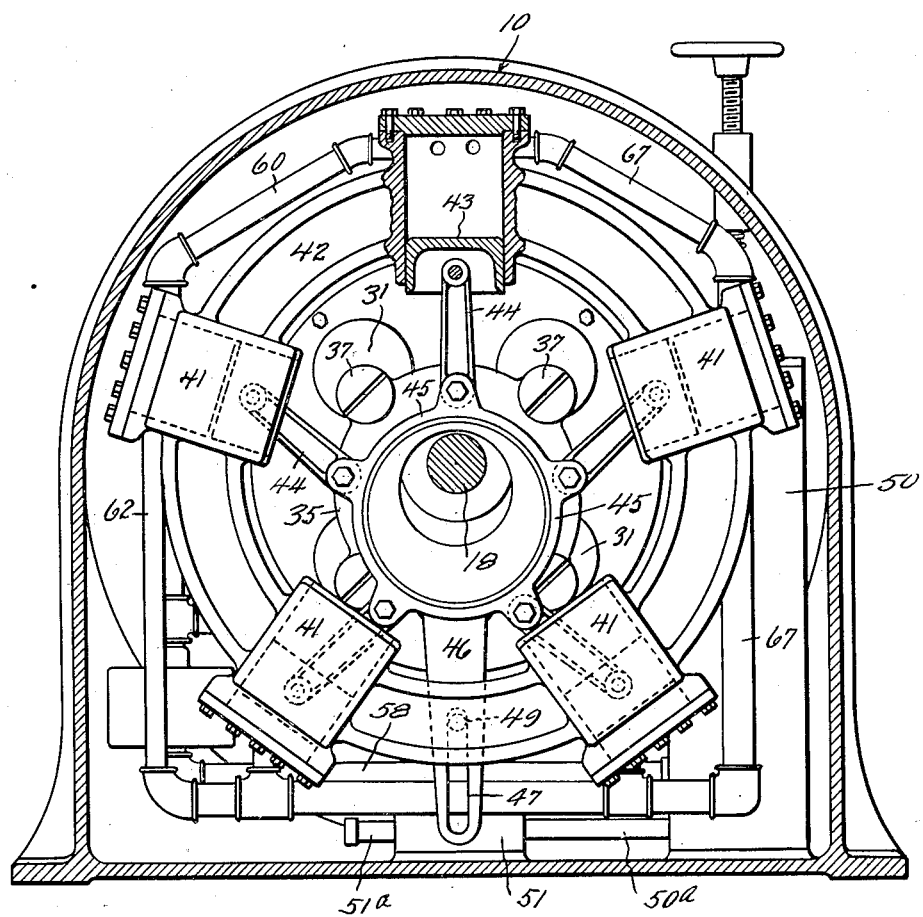
Figure 3:
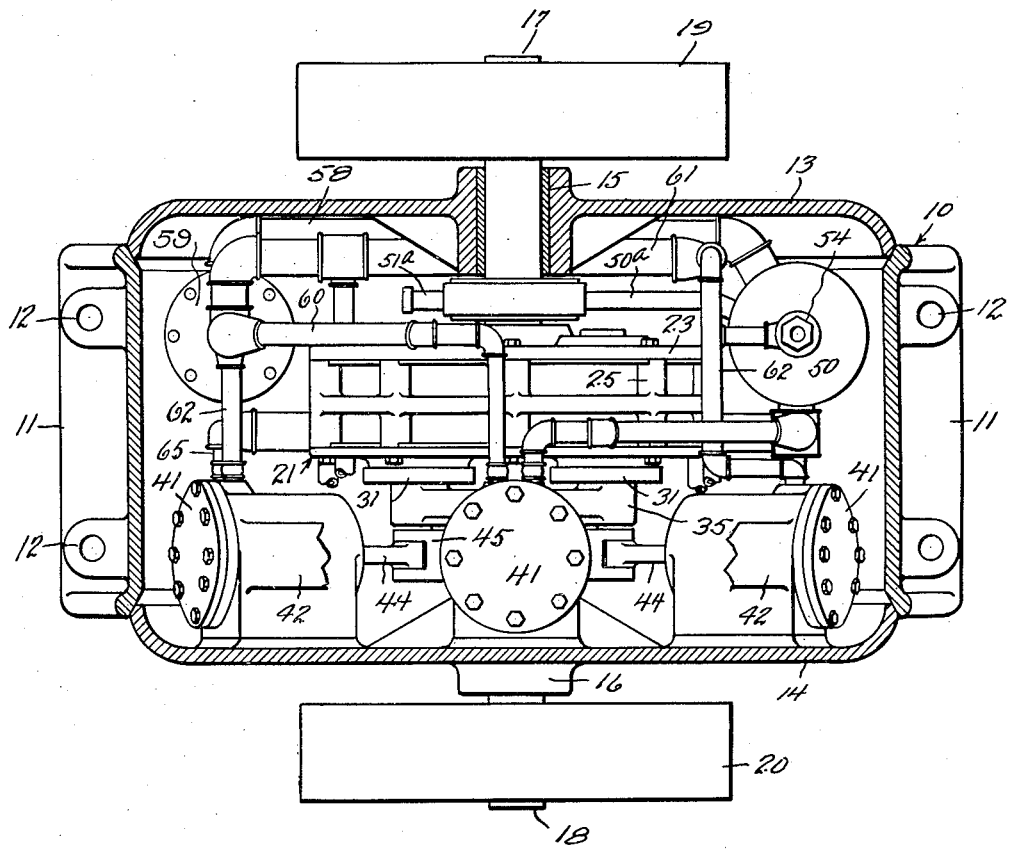
Figure 4:
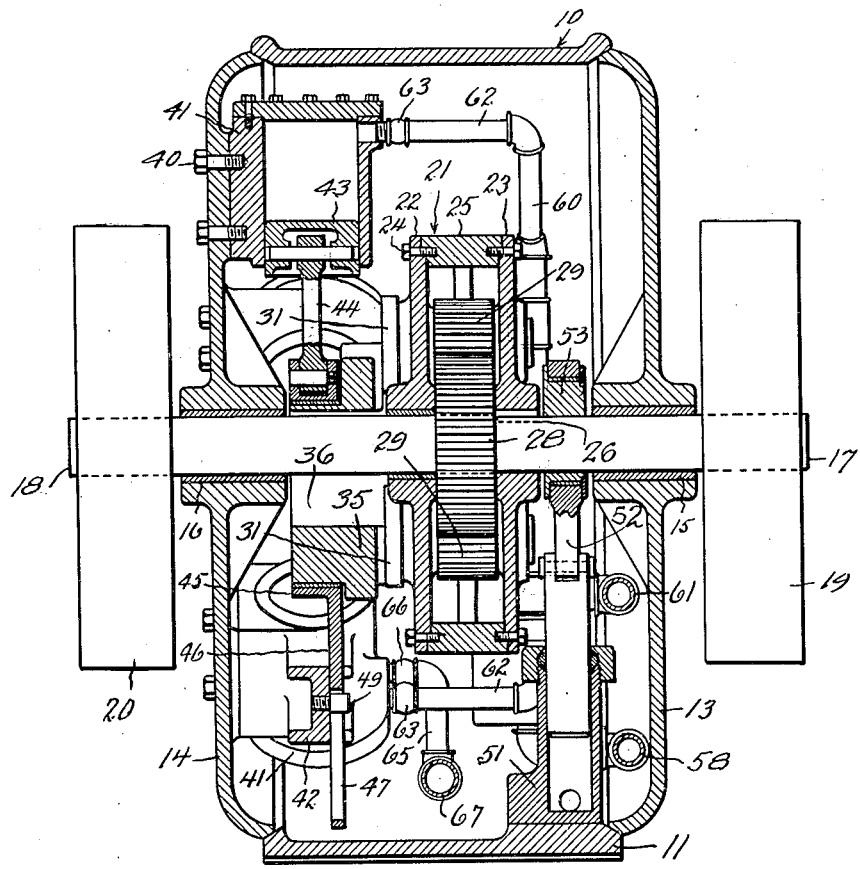
Figure 6:
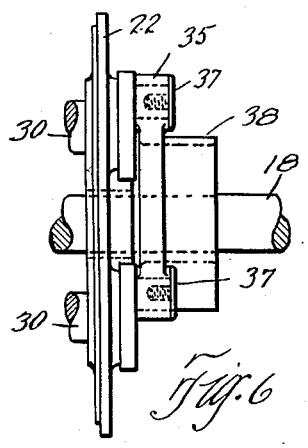
Figure 5:
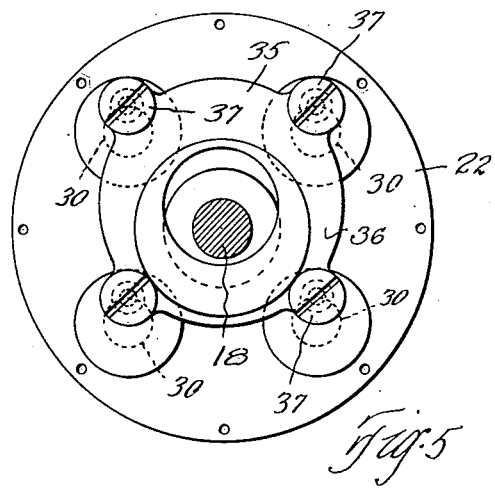
Figure 8:
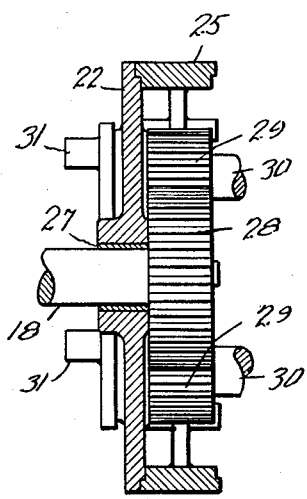
Figure 7:
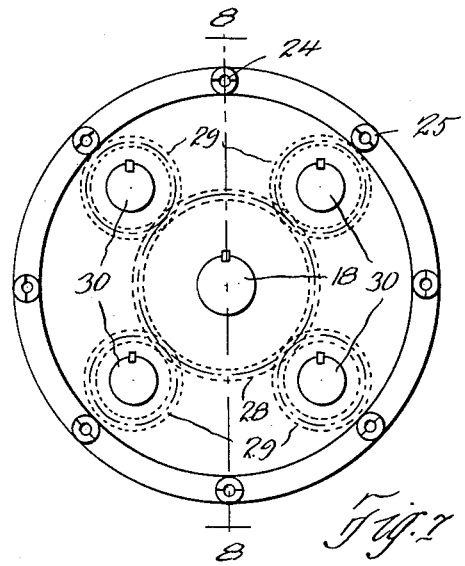
Figure 9:
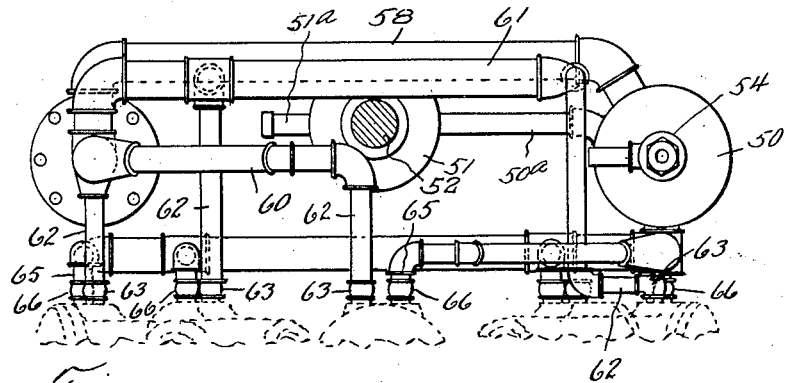
Figure 10:
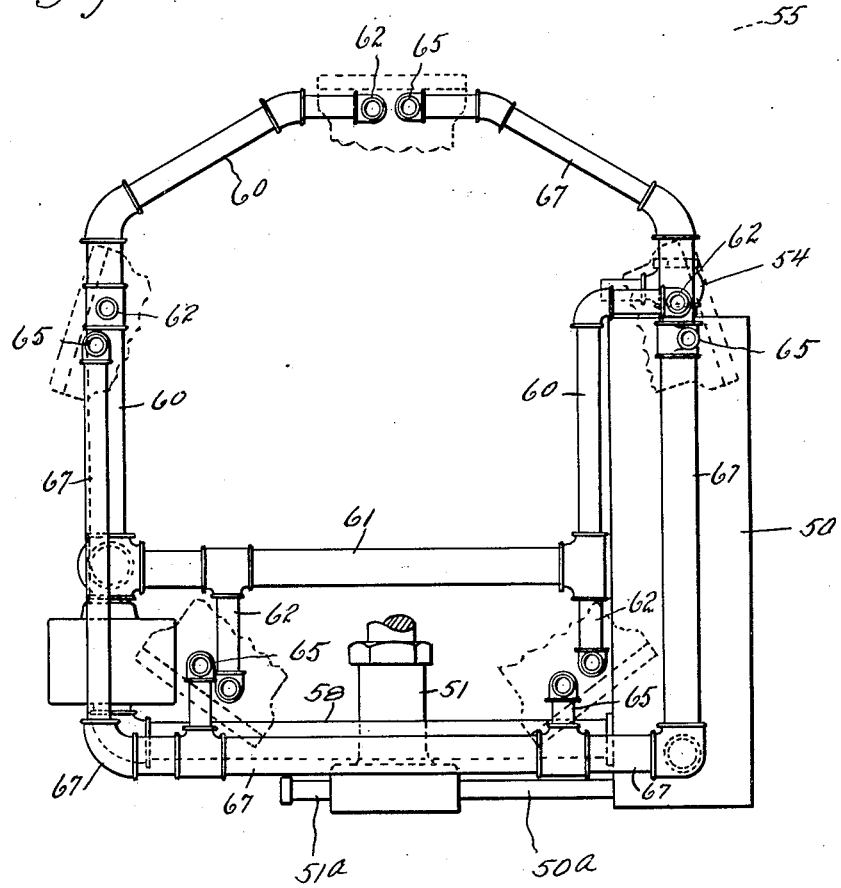

In the drawings accompanying this specification, Fig. 1 is a vertical sectional view through the transmission with the parts in the position they assume when the driven shaft is running at the same speed as the driving shaft; Fig. 2 a view similar to Fig. 1 but showing the eccentric and pistons in one position they assume when no power is being transmitted to the driven shaft with the driving shaft rotating; Fig. 3 is a top plan view of the operating mechanism of the transmission with the casing shown in section; Fig. 4 is a vertical sectional view on line 4—4 of Fig. 1; Fig. 5 is a side elevation of the planetary gear housing with the eccentric attached to the four concentrically arranged gears; Fig. 6 is an end view of the planetary gear housing plate and eccentric shown in Fig. 5; Fig. 7 is a side elevation of the planetary gear box with side plate removed; Fig. 8 is a sectional view through the planetary gear box on line 8—8 of Fig. 7; Fig. 9 is a top plan view of the system of pipe for leading the fluid to and from the cylinders; and Fig. 10 is a side elevation of the piping system shown in Fig. 9.

In describing my invention, reference is made to the accompanying drawings in which like reference numerals indicate like parts in the several views.

In the drawings, 10 designates the housing for the power transmitting mechanism which has a base 11 with suitable openings 12 for securing it rigidly to a support. The opposite sides 13 and 14 of the housing are provided with aligned bearings 15 and 16 respectively in which two shafts 17 and 18 are journaled. On the outer end of each shaft 17 and 18 is a belt wheel designated 19 and 20 respectively, by which one shaft may be connected to a driving member, and the other to whatever mechanism is to be driven.

Mounted on the inner end of the shaft 17 is a gear cage 21 comprising two parallel circular plates 22 and 23 secured at their outer edges by screws 24 to a spacing ring 25 which forms the peripheral wall of the circular gear cage.

The side plate 22 and 23 of the cage are provided at their centers with aligned openings into which the shafts 17 and 18 extend, the side plate 23 being non-rotatably secured to the shaft 17 by the key 26, so that the entire cage 21 rotates with the shaft 17. The plate 22 is provided with a bearing 27 in which the shaft 18 may rotate. Rigidly secured to the inner end of the shaft 18 within the gear cage 21 is a gear 28 meshing with pinion gears 29 which are keyed to pinion shafts 30. The pinion shafts 30 are journaled in the gear case 21 and each has one end projecting through the side wall 22. On the outer end of each pinion shaft is an integral crank 31.

A spider member 35 having a large central aperture 36 encircles the shaft 18 and is secured to the cranks 31 on the pinion shafts by screws 37, so that when the pinions 29 rotate the spider is moved eccentrically about the shaft 18.

The spider 35 is provided with an eccentrically arranged bearing 38 which, when the spider 35 is moved on the cranks 31 radially in one direction will be in concentric relation with the shaft 18, as illustrated in Fig. 1.

Secured rigidly to the casing 10 by means of bolts 40 are five radially disposed cylinders 41 arranged in concentric relation about the shaft 18, and integrally connected with each other by a web 42. Pistons 43 which reciprocate in the cylinders 41 are connected by means of connecting rods 44 to a collar 45 that fits about the eccentric 38 and in which said eccentric rotates. The collar 45 is provided with a radial arm 46 having a slot 47 at its outer end which engages over a pin 49 in the web 42. The arm 46 prevents rotation of the collar with the eccentric 38 and yet permits it to move eccentrically therewith about the shaft 18.

Within the housing 10 is a pressure tank 50 into which a fluid, preferably the oil from the housing itself is forced through the conduit 50ᵃ by means of a pump 51. The pump illustrated is of the usual piston type with an inlet at 51ᵃ and is operated by the piston rod 52 from the eccentric 53 which is secured to the shaft 17. The pressure within the tank 50 is controlled by means of a suitable relief valve 54 which may be regulated by the screw 55 to increase or decrease the pressure as desired.

From the tank 50 an outlet line 58 leads to the high pressure side of a pressure reducing valve 59. Conduits 60 lead from the low pressure side of the valve 59 and to these conduits 60 each cylinder 41 is connected by pipes 62 which are provided with check valves 63. The pressure reducing valve 59 is preferably one in which the fluid pressure is reduced in the ratio of approximately 20 to 1.

Outlet pipes 65 provided with check valves 66 connect each cylinder 41 with the return line indicated generally by the reference numeral 67 which leads back to the tank 50.

In operation the housing 10 is filled with a quantity of oil sufficient to fill the tank 50 and the conduits, and leave an excess in the bottom of the housing.

With power being supplied to the shaft 17 either by means of the belt wheel 19 or by any other means, and the shaft 18 connected to the device to be driven and with the relief valve 54 open so that substantially no pressure is built up in the tank 50 the shaft 17 is free to rotate and the shaft 18 may remain still. The gear housing 25 of course rotates with the shaft 17 and the pinions 29 are rotated as they revolve about the gear 28. The spider 35 rotates with the gear casing 25 and at the same time has an eccentric movement about the shaft 18 imparted to it by the cranks 31 on the pinions to which it is connected. This same eccentric motion is of course imparted to the collar 45 to which the pistons 43 are connected by the connecting rods 44 and as long as the bearing 38 is in any position eccentric with the shaft 18 the pistons 43 reciprocate in the cylinders 41 as the gear cage 21 rotates. With the pistons free to reciprocate there is substantially no torque transmitted to the gear 28 by the pinions 29 since they are free to revolve about that gear.

By closing the relief valve 54 pressure is built up in the tank 50 by the pump 51 and the oil is forced into the cylinders 41 through the pipe lines 60 at a pressure considerably lower than the pressure in the tank 50 since it is passed through the pressure reducing valve 59. On the inward stroke of each piston 43 the oil flows into the cylinder and on the outward stroke is forced out through the check valve 66 into the return line 67 where it returns to the tank 50, the check valves 63 preventing the oil from being pumped back into the inlet lines 60.

As the pressure is built up in the tank 50 the back pressure in each cylinder 41 becomes greater. The pistons 43 operating against this pressure through the rods 44 and collar 45 resist the eccentric motion of the spider 35 imparted by the pinions 29 and hence when the pinions 29 cannot rotate freely in their bearings they impart a torque to the gear 28 and the shaft 18 is rotated slowly while the pinions revolve about it. By increasing the fluid pressure in the cylinders 41 greater resistance is offered to the rotation of the pinions and hence to their revolution about the gear 28 so that more and more power is transmitted to the shaft 18.

When the pressure in the cylinders becomes so great that the force retarding the eccentric movement of the spider 35 is greater than the force operating against the shaft 18 then the eccentric 38 is forced into concentric relation with the shaft 18 by the fluid pressure in the cylinders as illustrated in Fig. 1 and the pinions 29 no longer rotate in their bearings, and hence the shaft 17, casing 21, gear 28 and shaft 18 rotate together. The spider 35 also rotates with the casing 21 and in the collar 45 and the pistons 43 remaining stationary.

By the mechanism above described it will be apparent that when the load on the driven shaft exceeds the force tending to prevent rotation of the pinions the speed of rotation of the driven shaft decreases relative to the driven shaft unless the fluid pressure in the cylinders is increased. Permitting the fluid pressure in the cylinders to remain constant the speed of the driven member will be automatically controlled by the variation in load applied. This is very desirable in many types of machines. The pressure of the cylinder may be adjusted so that when the driven machine is loaded beyond a predetermined point the driven shaft will stop completely, the transmission thus functioning as an automatic release. On reducing the load the driven device will again operate as before.

By regulating the fluid pressure by the valve to the pressure tank the driving mechanism may be only very gradually loaded or unloaded as desired.

It will be seen that due to the particular construction of this transmission it has unlimited utility in many fields in industry where mechanism or automatic control of a driven machine in relation to the source of power is desired either for gradual application or release of the load or where the power or speed which is applied to the driven device must be governed by the particular load on the driven machine.

While I have illustrated and described one embodiment of my invention it is obvious that various changes may be made without departing from the spirit of the invention or the scope of the appended claims.

Having thus described my invention what I claim is:

1. In a power transmission mechanism, the combination of a driving member and a driven member, a gear frame secured to rotate with one of said members, pinion gears journaled in said frame, a gear secured to the other of said members meshing with said pinions, means for preventing the pinions from rotating about the gear and in said frame, said means including eccentric means on said pinions, a spider connecting said eccentric means, and means engaging said spider to prevent eccentric movement of the same relative to said frame.

2. In a power transmission mechanism, the combination of a driving and a driven member, a gear frame constructed to rotate with one of said members, pinion gears journaled in said frame, a main gear carried by the other member meshing with said pinion gears about which they may revolve, eccentric means on said pinions, a member connecting said eccentric means and adapted to rotate with said gear frame, and means for preventing eccentric movement of said member relative to the axis of said gear frame whereby the rotation of said pinions in the gear frame may be controlled.

3. In a power transmission mechanism, the combination of a driving and a driven member, a gear frame constructed to rotate with one of said members, pinion gears journaled in said frame, a main gear carried by the other member meshing with said pinion gears about which they may revolve, crank means on said pinions, a member connecting said cranks and adapted to rotate with said gear frame, fluid pressure means for preventing eccentric movement of said member relative to the axis of said gear frame.

4. In a power transmission mechanism, the combination of a driving and a driven member, a gear frame constructed to rotate with one of said members, pinion gears journaled in said frame, a main gear carried by the other member meshing with said pinion gears about which they may revolve, eccentric members on said pinions, a member connecting said eccentric members and adapted to rotate with said gear frame, a journal on said member eccentrically arranged in reference to a circle passing through the centers of said eccentric members, said journal, at one position of said eccentric members as they revolve, being concentric with the axis of rotation of said gear frame, and means for opposing the eccentric movement of said member whereby resistance is offered to the rotation of said pinion gears and the said main gear caused to rotate with said gear frame.

5. In a power transmission mechanism, the combination of a driving and a driven member, a gear frame constructed to rotate with one of said members, pinion gears journaled in said frame, a main gear carried by the other member meshing with said pinion gears about which they may revolve, eccentric members on said pinions, a member connecting said eccentric members and adapted to rotate with said gear frame, a journal on said member eccentrically arranged in reference to a circle passing through the centers of said crank members, said journal, at one position of said eccentric members as they revolve, being concentric with the axis of rotation of said gear frame, radially disposed cylinders secured in fixed relation about the axis of said gear frame, pistons in said cylinders, a bearing member in which said journal rotates, connecting rods connecting said pistons to said bearing member, and means for forcing a fluid into said cylinders for varying the force exerted by said pistons in resisting the eccentric movement of said connecting member.

6. In a power transmission mechanism, the combination of a driving member and a driven member, a planetary arrangement of gears connecting said members including a main gear and pinion gears, means for transmitting power from one member to the other through said gears comprising means for varying the speed of rotation of the pinion gears relative to said main gear, including fluid controlled pistons and separate means for creating a pressure on the fluid for controlling the operation of said pistons.

7. In a power transmission mechanism, the combination of a driving member and a driven member, a planetary arrangement of gears connecting said members including a main gear and pinion gears, means for transmitting power from one member to the other through said gears comprising means for varying the speed of rotation of the pinion gears relative to said main gear, including pistons operatively connected to the pinion gears, said pistons operating against fluid pressure, and means for imparting pressure to the fluid against which said pistons operate.

8. In a power transmission mechanism, the combination of a driving member and a driven member, a planetary arrangement of gears connecting said members including a main gear and pinion gears, means for transmitting power from one member to the other through said gears comprising means for varying the speed of rotation of the pinion gears relative to said main gear, including pistons operatively connected to the pinion gears, said pistons operating against fluid pressure, and means for imparting pressure to the fluid against which said pistons operate, comprising an independently operating pump, and means for varying the pressure of said fluid.

9. In a power transmission mechanism, the combination of a driving member and a driven member, a planetary arrangement of gears connecting said members including a main gear and pinion gears, means for transmitting power from one member to the other through said gears comprising means for varying the speed of rotation of the pinion gears relative to said main gear, including eccentric means on said pinions, a member connecting said eccentric means, means on said member eccentrically disposed relative to the axis of revolution of said pinions when said pinions are rotating, and means for forcing said means into concentric relation with said axis of revolution of said pinions.

10. In a power transmission mechanism, the combination of a driving member and a driven member, a planetary arrangement of gears connecting said members including a main gear and pinion gears, means for transmitting power from one member to the other through said gears comprising means for varying the speed of rotation of the pinion gears relative to said main gear, including eccentric means on said pinions, a member connecting said eccentric means, means on said member eccentrically disposed relative to the axis of revolution of said pinions when said pinions are rotating, and means for forcing said means into concentric relation with said axis of revolution of said pinions, said last mentioned means including pistons operating against fluid pressure, and means for varying said pressure.

11. In a power transmitting mechanism, the combination of a driving member and a driven member, a planetary arrangement of gears connecting said members including a main gear and pinion gears, means for transmitting power from one member to the other through said gears comprising means for varying the speed of revolution of the pinion gears around said main gear including pistons operating against fluid pressure, a fluid circulating system for leading fluid to and from said pistons, said system including means for creating pressure on said fluid, and automatic means for feeding the fluid to the pistons at a low pressure, and for maintaining a high back pressure in the line into which said fluid is discharged.

12. In a power transmitting mechanism, a driving member, a driven member axially aligned with said driving member, a main gear on one of said members, pinion gears carried by the other member meshing with said main gear and revoluble thereabout, and provided with eccentric means, a spider member connecting said eccentric means and revoluble with said other member, a bearing on said spider which when the eccentric means on said pinions are in one direction only is concentric with the axis of said other member, and means for forcing said bearing into concentric relation therewith, whereby the rotation of said pinions about the main gear is prevented.

13. In a power transmitting mechanism, a driving member, a driven member axially aligned with said driving member, a main gear on one of said members, pinion gears carried by the other member meshing with said main gear and revoluble thereabout, and provided with crank means, a spider member connecting said crank means and revoluble with said other member, a bearing on said spider which when the cranks on said pinions are in one direction only is concentric with the axis of said other member, said means including radially disposed cylinders, pistons movable in said cylinders operatively connected with said bearing to be reciprocated by said spider member as the parts rotate, and external means for forcing a fluid into said cylinders to oppose the reciprocation of said pistons.

14. In a power transmitting mechanism, a driving member, a driven member axially aligned with said driving member, a main gear on one of said members, pinion gears carried by the other member meshing with said main gear and revoluble thereabout, and provided with eccentric means, a spider member connecting said eccentric means and revoluble with said other member, a bearing on said spider which when the eccentric means on said pinions are in one direction only is concentric with the axis of said other member, cylinders radially disposed about said bearing and pistons in said cylinders operatively connected therewith, a fluid circulating system to which each cylinder is connected including a pressure chamber, means for controlling the pressure therein, and means for feeding the fluid to the cylinders from said chamber at a pressure less than that at which it is discharged from the cylinders thereinto.

15. In a power transmitting mechanism of the class described including cylinders in which pistons operate against fluid pressure for causing power to be transmitted from one member to another, said cylinders having inlet and outlet ports, a fluid circulating system including means for feeding the fluid discharged from said cylinders back into said cylinders at a reduced pressure.

16. In a power transmitting mechanism of the class described including cylinders in which pistons operate against fluid pressure for causing power to be transmitted from one member to another, said cylinders having inlet and outlet ports, a fluid circulating system including a pump for creating pressure in said system, and means permitting the fluid to pass into said cylinders at a pressure materially less than the pressure against which the fluid is discharged therefrom.

17. In a power transmitting mechanism of the class described including cylinders in which pistons operate against fluid pressure for causing power to be transmitted from one member to another, said cylinders having inlet and outlet ports, a fluid circulating system including a pump for creating pressure on the fluid and a pressure reducer valve through which the fluid passes for reducing the pressure of the fluid taken into the cylinders, and means for varying the pressure of the fluid in the system.

18. In a power transmitting mechanism of the class described including cylinders in which pistons operate against fluid pressure for causing power to be transmitted from one member to another, said cylinders having inlet and outlet ports, a fluid circulating system including a fluid chamber for receiving fluid from said cylinders and from which fluid is taken into said cylinders, a pressure reducing valve through which the fluid passes from the chamber to said cylinders, check valves to prevent a return of the fluid therethrough and means for creating a pressure on the fluid in the chamber against which pressure the pistons operate on their outward stroke, and means for varying the pressure in said chamber.

19. A mechanical movement for transferring a constant rotary motion into differential rotary motion and/or reciprocatory motion of varying or constant magnitude comprising a rotatable shaft, a frame secured for rotation therewith, pinion gears journaled for rotation in said frame, a main gear operatively associated with said pinions and meshing therewith, said frame and main gear being relatively rotatable, eccentric means on said pinions, a spider connecting the eccentric means on said pinions, a bearing member on said spider which is moved toward and away from a concentric position relative to the axis of rotation of said frame when the pinions rotate relative to the main gear, and means for controlling the relative speed of rotation of said main gear and said frame with respect to each other.

20. A mechanical movement for transferring a constant rotary motion into differential rotary motion and/or reciprocatory motion of varying or constant magnitude comprising a rotatable shaft, a frame secured for rotation therewith, pinion gears journaled for rotation in said frame, a main gear operatively associated with said pinions and meshing therewith, said frame and main gear being relatively rotatable, eccentric means on said pinions, a spider connecting the eccentric means on said pinions, a bearing member on said spider which is moved toward and away from a concentric position relative to the axis of rotation of said frame when the pinions rotate relative to the main gear, and means for resisting the eccentric movement of said spider relative to the axis of rotation of said frame.

21. A mechanical movement for transferring a constant rotary motion into differential rotary motion and/or reciprocatory motion of varying or constant magnitude comprising a rotatable shaft, a frame secured for rotation therewith, pinion gears journaled for rotation in said frame, a main gear operatively associated with said pinions and meshing therewith, said frame and main gear being relatively rotatable, eccentric means on said pinions, a spider connecting the eccentric means on said pinions, a bearing member on said spider which is moved toward and away from a concentric position relative to the axis of rotation of said frame when the pinions rotate relative to the main gear, a member to which said bearing is journaled, and means associated with said member for resisting the eccentric motion of said spider relative to the axis of rotation of said frame.

22. A mechanical movement for transferring a constant rotary motion into differential rotary motion and/or reciprocatory motion of varying or constant magnitude comprising a rotatable shaft, a frame secured for rotation therewith, pinion gears journaled for rotation in said frame, a main gear operatively associated with said pinions and meshing therewith, said frame and main gear being relatively rotatable, eccentric means on said pinions, a spider connecting the eccentric means on said pinions, a bearing member on said spider which is moved toward and away from a concentric position relative to the axis of rotation of said frame when the pinions rotate relative to the main gear, a collar in which said bearing member is journaled, means for preventing rotation of said collar, and pistons diametrically arranged relative to the axis of said frame and operatively connected with said collar for resisting the eccentric motion of said member relative to the axis of rotation of said frame.

23. A mechanical movement for transferring a constant rotary motion into differential rotary motion and/or reciprocatory motion of varying or constant magnitude comprising a rotatable shaft, a frame secured for rotation therewith, pinion gears journaled for rotation in said frame, a main gear operatively associated with said pinions and meshing therewith, said frame and main gear being relatively rotatable, eccentric means on said pinions, a spider connecting said eccentric means provided with a bearing portion which is concentric with the axis of rotation of said frame when said eccentric means on said pinions are in one position in the rotation relative to said frame, and eccentrically disposed relative to said axis at all other positions of said eccentric means relative to said frame, and means for controlling the speed of rotation of said main gear relative to said frame.

24. A mechanical movement for transferring a constant rotary motion into differential rotary motion and/or reciprocatory motion of varying or constant magnitude comprising a rotatable shaft, a frame secured for rotation therewith, pinion gears journaled for rotation in said frame, a main gear operatively associated with said pinions and meshing therewith, said frame and main gear being relatively rotatable, eccentric means on said pinions, a spider connecting said eccentric means provided with a bearing portion which is concentric with the axis of rotation of said frame when said eccentric means on said pinions are in one position in their rotation relative to said frame, and eccentrically disposed relative to said axis at all other positions of said eccentric means relative to said frame, and means for resisting the eccentric movement of said spider relative to the axis of rotation of said frame.

In testimony whereof, I hereunto affix my signature.

CHARLES C. HOWER.